March 24, 1931.                C. C. FARMER                    1,797,411
                              FLUID PRESSURE BRAKE
                              Filed Nov. 9, 1929
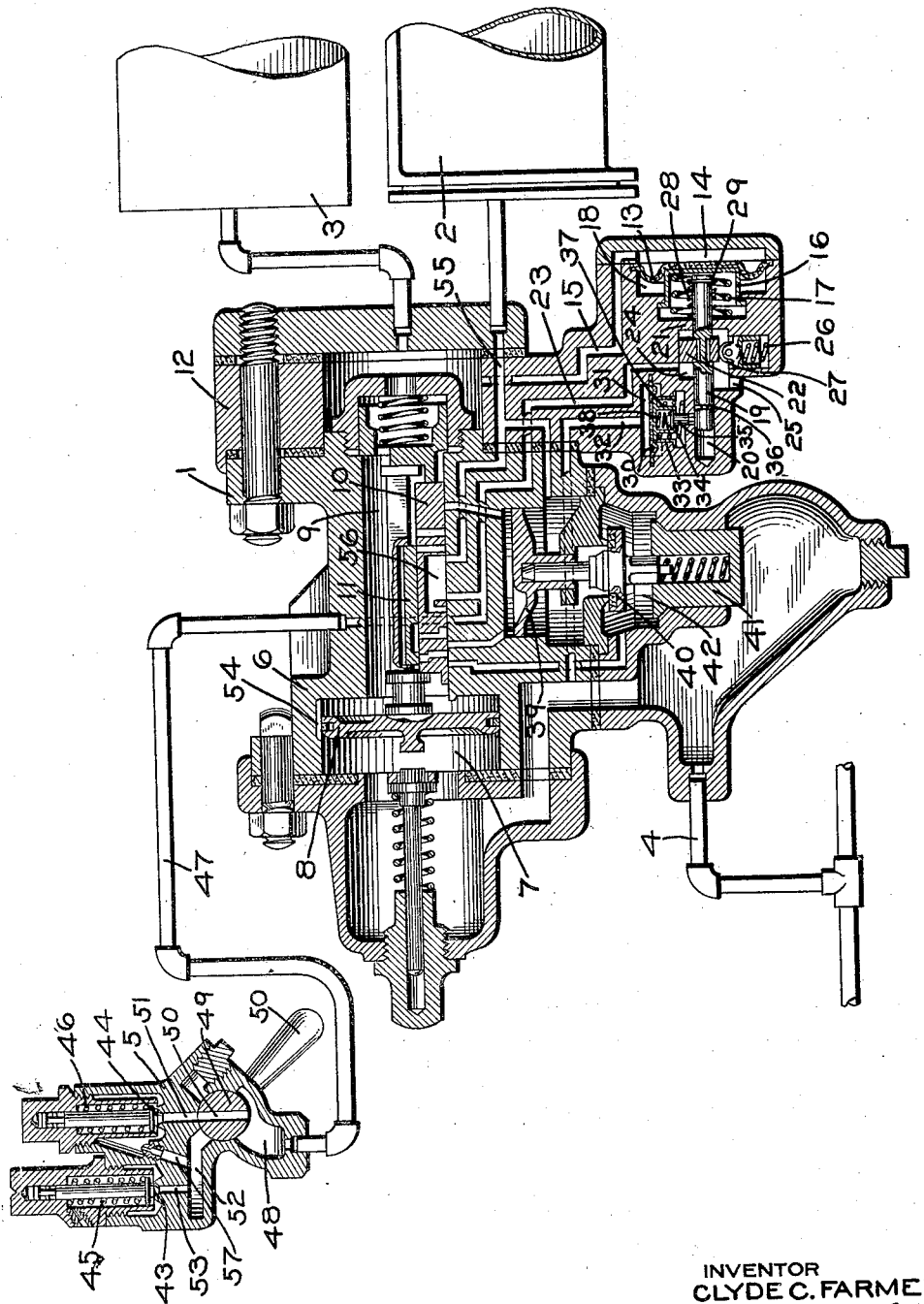
INVENTOR
CLYDE C. FARMER
BY  Wm. M. Cady
                ATTORNEY Patented Mar. 24, 1931

1,797,411

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID-PRESSURE BRAKE

Application filed November 9, 1929. Serial No. 405,895.

This invention relates to fluid pressure brakes and has for its principal object to provide means whereby the engineer may obtain at will either a direct release of the brakes in the train or a retained fluid pressure in the brake cylinder in releasing the brakes.

In the accompanying drawing, the single figure is a sectional view of a car fluid pressure brake apparatus embodying my invention.

The equipment shown in the drawing comprises a triple valve device 1, a brake cylinder 2, an auxiliary reservoir 3, a brake pipe 4, and a pressure retaining valve device 5. The triple valve device 1 may be of the usual construction comprising a casing 6 having a piston chamber 7, connected to the brake pipe 4 and containing a piston 8 and having a valve chamber 9 connected to the auxiliary reservoir 3 and containing a main slide valve 10 and a graduating slide valve 11, adapted to be operated by piston 8.

In addition, a release controlling valve device may be associated with the triple valve device and may comprise a filling piece 12 containing a diaphragm 13 having the chamber 14 at one side connected through a passage 15 with the auxiliary reservoir 3. A spring stop member 16, subject to the pressure of a coil spring 17, is mounted in chamber 18, and engages the diaphragm 13. A valve stem 19, having a guiding fit in a bore 20 of the filling piece 12 and in a bore of a partition wall 21 is adapted to operate a slide valve 22 for controlling communication from an exhaust passage 23, leading to the seat of slide valve 10, to valve chamber 24, which is open to the atmosphere through passage 25.

The valve 22 is subject to the pressure of a spring 26, which acts on the valve through a roller 27. A coil spring 28 on the stem 19 is interposed between the wall 21 and a collar 29 on the stem and tends to maintain the valve stem in the position shown in the drawing.

Also contained in the filling piece 12 is a diaphragm 30, having the chamber 31 at one side connected to a passage 32, which communicates with the brake pipe 4. A spring follower 33 engages the opposite side of the diaphragm 30 and is subject to the pressure of a coil spring 34. A pin 35 is provided, having a teat adapted to engage in an annular groove 36 on the stem 19, when the stem is moved so that the teat is in alinement with the groove.

The pin 35 is provided with a flange which is mounted in a cage 37 of the follower 33 and is subject to the pressure of a spring 38.

The triple valve casing 6 also contains the usual quick action valve mechanism comprising a piston 39, a brake pipe vent valve 40 adapted to be operated by said piston, and a check valve 41, controlling communication from the brake pipe 4 to vent valve chamber 42.

The retaining valve device 5 may comprise a casing containing retaining valves 43 and 44, subject respectively to the pressures of springs 45 and 46. A pipe 47 connects exhaust passage 23 with chamber 48 of the retaining valve device and a cock 49 operable by a handle 50 is adapted in one position to connect chamber 48, through port 50 with a passage 51 leading to the retaining valve 44, and in another position to connect said chamber with a chamber 52, having a passage 53, leading to the retaining valve 43.

The pressure of spring 17 is such that when the normal pressure is carried in the brake system, and in the auxiliary reservoir, the pressure of the spring 17 will be sufficient to maintain the diaphragm 13 in the position shown in the drawing, with the stem 19 maintained in its right hand position by spring 28, so that valve 22 uncovers passage 23. The spring 34 is of such force that it will operate the diaphragm 30 to retract the pin 35 from the stem 19 when the brake pipe pressure has been reduced a predetermined degree below the normal running pressure, preferably a predetermined degree below that required to effect a full service application of the brakes.

In operation, when the usual normal running pressure is carried in the brake pipe, the auxiliary reservoir is charged from the brake pipe through the usual feed groove 54, and fluid under pressure from the auxiliary reservoir is supplied through passage 15 to diaphragm chamber 14.

This normal running pressure is not sufficient to overcome the resistance of the spring 17, so that the stem 19 holds the valve 22 in the position shown in the drawing, in which passage 23 is open to the atmospheric exhaust passage 25. When the brakes are released, the brake cylinder 2 is connected through passage 55, and cavity 56 in slide valve 10 with passage 23, so that fluid under pressure is vented directly to the atmosphere, by way of exhaust port 25.

If it is desired to retain pressure in the brake cylinder when the brakes are released, the engineer adjusts the usual feed valve device (not shown) on the locomotive, so as to provide a definite higher pressure in the brake pipe than the normal pressure carried in the brake pipe.

When the auxiliary reservoir is charged at this higher pressure, the auxiliary reservoir pressure acting in diaphragm chamber 14 is sufficient to overcome the pressure of spring 17, so that the stem 19 is shifted to the left, causing the valve 22 to be moved, so as to blank the passage 23.

When the brake pipe pressure is increased to effect the release of the brakes, the passage 23 being cut off from the exhaust port 25, fluid under pressure from the brake cylinder can only escape by way of pipe 47 and the retaining valve device.

If the retaining valve cock 49 is set in the position shown in the drawing, fluid from the brake cylinder will flow past the retaining valve 44 and through passages 57 to chamber 52, and thence past the retaining valve 43.

If the cock 49 is set to another position, fluid from the brake cylinder is released past the retaining valve 43 only, and the pressure retained in the brake cylinder then depends on the setting of the retaining valve 43.

When the stem 19 is moved to the left, as above described, the teat on the pin 35 is shifted into the groove 36 and thereby locks the stem 19 in its left hand position.

The locking of the stem in this position prevents movement of the stem toward the right when the auxiliary reservoir pressure is reduced in diaphragm chamber 14 in effecting applications of the brakes, even when the brake pipe pressure is reduced to the extent that a full service application of the brakes is effected.

In order to release the pin 35 from its locking engagement with the stem 19, it is necessary to reduce the brake pipe pressure to a predetermined degree below the normal pressure carried in the brake pipe, preferably to a predetermined degree below that required to effect a full service application of the brakes. When the brake pipe presure is thus reduced, the spring 34 overcomes the brake pipe pressure in chamber 31 and the diaphragm 30 is moved upwardly, so as to lift the pin 35 out of engagement with the groove 36.

The auxiliary reservoir pressure in chamber 14 being correspondingly reduced, the diaphragm 13 is moved to the right by spring 17, so that the stem 19 is returned to its right hand position by spring 28, thus causing the valve 22 to uncover the passage 23.

The brake pipe pressure may now be increased to the normal pressure, the feed valve device having been adjusted to maintain the brake pipe pressure at the normal pressure instead of the higher than normal pressure, and the parts of the release controlling valve device will remain in the positions shown in the drawing.

The frictional resistance of the pin 35 to movement of the stem 19 is limited by making the pin 35 movable relatively to the diaphragm 30 and by employing the relatively light spring 38, through which spring the pin is pressed into engagement with the stem. Thus the pressure with which the pin 35 presses against the stem 19 is limited to the pressure exerted by the spring 38.

While one illustrative embodiment of the invention has been described in detail, it is not my intention to limit its scope to that embodiment or otherwise than by the terms of the appended claims.

Having now described my invention, what is claimed as new and desired to be secured by Letters Patent, is:

1. In a fluid pressure brake, the combination with a brake cylinder, brake pipe, and triple valve device, of a valve for controlling communication through said triple valve device from the brake cylinder to a direct exhaust port, means operated by an increase in brake pipe pressure above normal for operating said valve to cut off said communication, and means for locking said valve in its cut-off position, said locking means being released upon a predetermined reduction in brake pipe pressure below the normal.

2. In a fluid pressure brake, the combination with a brake cylinder, brake pipe, and triple valve device, of a valve for controlling communication through said triple valve device from the brake cylinder to a direct exhaust port, a movable abutment subject to the opposing pressures of a spring and fluid pressure and operated upon an increase in fluid pressure above the normal brake pipe pressure for shifting said valve to close said communication, a locking member for locking said valve in its closed position, and a movable abutment operated upon a predetermined reduction in pressure below the normal brake pipe pressure for releasing said locking member.

3. In a fluid pressure brake, the combination with a brake cylinder, brake pipe, and auxiliary reservoir, of a valve for controlling communication from the brake cylinder to a direct exhaust port, a movable abutment subject to auxiliary reservoir pressure and operated upon a predetermined increase in auxiliary reservoir pressure for shifting said valve to close said communication, a locking member for locking said valve in its closing position, and a movable abutment subject to brake pipe pressure and operated upon a predetermined reduction in brake pipe pressure for releasing said locking member.

4. In a fluid pressure brake, the combination with a brake cylinder, brake pipe, and auxiliary reservoir, of a valve for controlling communication from the brake cylinder to a direct exhaust port, a movable abutment subject to auxiliary reservoir pressure and operated upon a predetermined increase in auxiliary reservoir pressure for shifting said valve to close said communication, a stem for operating said valve, a locking member for locking said stem and thereby said valve in its closing position, and a movable abutment subject to brake pipe pressure and operated upon a predetermined reduction in brake pipe pressure below the normal for operating said member to release said stem.

In testimony whereof I have hereunto set my hand, this 6th day of November, 1929.

CLYDE C. FARMER.